(12) United States Patent
Martin et al.

(10) Patent No.: US 8,726,751 B2
(45) Date of Patent: May 20, 2014

(54) METHOD FOR QUICKLY FILLING A HYDRAULICALLY ACTUATED MULTIPLE DISC SHIFTING ELEMENT OF A MOTOR VEHICLE TRANSMISSION

(75) Inventors: Gerhard Hermann Martin, Tettnang (DE); Wilfrid Eberhard, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 93 days.

(21) Appl. No.: 13/515,516

(22) PCT Filed: Nov. 24, 2010

(86) PCT No.: PCT/EP2010/068078
§ 371 (c)(1),
(2), (4) Date: Jun. 13, 2012

(87) PCT Pub. No.: WO2011/073000
PCT Pub. Date: Jun. 23, 2011

(65) Prior Publication Data
US 2012/0247611 A1    Oct. 4, 2012

(30) Foreign Application Priority Data
Dec. 18, 2009  (DE) .......................... 10 2009 054 940

(51) Int. Cl.
*F16H 59/00*    (2006.01)
(52) U.S. Cl.
USPC .......................................................... 74/335

(58) Field of Classification Search
USPC .............................. 74/335; 477/156, 175, 181
See application file for complete search history.

(56) References Cited

U.S. PATENT DOCUMENTS

| | | | | |
|---|---|---|---|---|
| 5,070,747 A | * | 12/1991 | Lentz et al. | 477/149 |
| 5,211,079 A | * | 5/1993 | Runde et al. | 477/61 |
| 6,101,438 A | * | 8/2000 | Staiger et al. | 701/55 |
| 6,567,733 B2 | | 5/2003 | Popp et al. | |
| 6,672,990 B2 | | 1/2004 | Netzer | |

FOREIGN PATENT DOCUMENTS

| | | |
|---|---|---|
| DE | 40 11 333 A1 | 10/1990 |
| DE | 199 17 575 A1 | 10/2000 |
| DE | 100 36 510 A1 | 2/2002 |
| DE | 100 42 146 A1 | 3/2002 |
| DE | 102 38 474 A1 | 3/2004 |
| EP | 0 668 456 A2 | 8/1995 |
| EP | 1 503 101 A1 | 2/2005 |

* cited by examiner

*Primary Examiner* — Ha D Ho
(74) *Attorney, Agent, or Firm* — Davis & Bujold, PLLC; Michael J. Bujold

(57) ABSTRACT

A method of the rapid filling of a hydraulically actuated multiple-disk shifting element (4) of a motor vehicle transmission (2), in particular a disk clutch (4) of an all-wheel transfer transmission (3). The disk shifting element (4) is filled using a target value (p_soll) for the filling pressure which depends on the motor speed (n_mot). In the event that the motor speed (n_mot) changes during a filling process, the target value (p_soll) for the filling pressure is adapted as a function of the new motor speed (n_mot).

8 Claims, 2 Drawing Sheets

METHOD FOR QUICKLY FILLING A HYDRAULICALLY ACTUATED MULTIPLE DISC SHIFTING ELEMENT OF A MOTOR VEHICLE TRANSMISSION

This application is a National Stage completion of PCT/EP2010/068078 filed Nov. 24, 2010, which claims priority from German patent application serial no. 10 2009 054 940.4 filed Dec. 18, 2009.

FIELD OF THE INVENTION

The invention relates to a method for the rapid filling of a hydraulically actuated multiple-disc shifting element of a motor vehicle transmission, in particular a disc clutch of an all-wheel transfer transmission.

BACKGROUND OF THE INVENTION

The ever-growing demands on the functionality of automatic transmissions arising from the need for greater spontaneity, the ever-increasing number of gears to be shifted, the consumption-optimized design of automatic transmissions with larger proportion of driving in the high gears and the large number of downshifts to be carried out when braking the vehicle to a standstill, entail that shifting between the gears of an automatic transmission has to be done ever more rapidly and frequently. Particularly for a sporty style of driving, the spontaneity of shifts is an important factor.

To carry out a gearshift, the shifting element to be shifted first has to be prepared to transmit torque, i.e. it must be filled, and rapid filling results in an increase of the shifting speed.

Multiple-disc clutches of all-wheel transfer transmissions, referred to as all-wheel disc clutches in what follows, have the special feature that as a rule they are permanently operated with slip; when an all-wheel disc clutch is actuated, a torque that is adjustable as a function of the actuation is transmitted to all the drive axles of the vehicle.

Since all-wheel disc clutches are operated permanently with slip, they are designed to be robust; furthermore, they have to meet particular requirements relating to adjustment accuracy, adjustment dynamics and the dynamics of the opening process, and to achieve good adjustment dynamics, an all-wheel disc clutch has to be filled as rapidly as possible.

From the prior art it is known to fill disc shifting elements in a time-controlled manner, the filling being carried out with reference to the motor speed at the moment when the filling process begins.

For example, from DE 100 36 510 C2 by the present applicant it is known to determine the filling level of a shifting element in an automatic transmission, both during filling and during draining, by means of an algorithm stored in the electronic control unit and, by means of the algorithm, to carry out the respective shifting element control for filling and the control of the shifting element for torque uptake and torque transmission. In this case, the duration of the shifting element's filling phase is determined by virtue of the algorithm.

SUMMARY OF THE INVENTION

The purpose of the present invention is to indicate a method for the rapid filling of a hydraulically actuated disc shifting element of a motor vehicle transmission, in particular a disc clutch of an all-wheel transfer transmission, by means of which the disc shifting element is filled as rapidly as possible; as a result, when the disc shifting element has been opened, it can be made ready again for operation as quickly as possible, i.e. the intended purpose of the system can be fulfilled as soon as possible.

Accordingly, a method is proposed for the rapid filling of a hydraulically actuated disc shifting element of a motor vehicle transmission, in particular a disc clutch of an all-wheel transfer transmission, in which the filling of the disc shifting element takes place as a function of the motor speed of the motor vehicle.

According to the invention, the disc shifting element is filled in a manner that depends on the motor speed, in that the disc shifting element is filled to a target value for the filling pressure which depends on the motor speed, and if the motor speed changes during a filling process the target value for the filling pressure is adapted as a function of the new motor speed.

According to the invention, if the motor speed increases, then the target value for the filling pressure is also increased since, due to the higher motor speed, a greater volume flow is available, whereas if the motor speed decreases the target value for the filling pressure is also reduced, having regard to a hysteresis that can be adjusted.

In the context of the invention the adjustable hysteresis is a negative offset which is added to the current motor speed, whereby it is ensured that a sufficient volume flow is available for filling the disc shifting element. For example, if the speed is reduced to 1000 revolutions per minute the filling is continued with reference to a speed of 950 revolutions per minute.

In a particularly advantageous variant of the method proposed here for the rapid filling of a hydraulically actuated disc shifting element, the motor speed range is divided into n intervals and a filling stage, i.e. a target pressure variation as a function of time is associated with each of the intervals, with which the disc shifting element is filled when the motor speed is within the interval concerned. According to the invention, the intervals can be equidistant.

In a further development of the invention, the target value for the filling pressure also depends on the transmission temperature, so that if the temperature increases the target value for the filling pressure is also increased because a temperature rise results in increased leakage losses in the system.

Furthermore, according to the invention it can be provided that the target value for the filling pressure optionally depends on the position of the selector lever, whereby in the selector lever positions P or N other filling priorities for the disc shifting element can be defined. For example, when the selector lever is in position N or P, the disc shifting element can be filled using a higher target value for the filling pressure as a function of time than in selector lever position D, since in those positions any pressure peaks and pressure drops are not so relevant for comfort as in the selector lever position D, where the shifting and driving comfort is especially important.

According to the invention, the end of the disc shifting element's filling is detected with reference to the preferably sensed pressure in the shifting element, which thus enables en event-controlled filling of the disc shifting element; advantageously, it is not necessary to specify fixed filling times and the disc shifting element is filled more quickly than in the prior art.

Preferably, the filling of the disc shifting element ends when the actual pressure in it, for example determined by a pressure sensor, as a function of the target value for the filling pressure, falls below a certain adjustable limiting pressure offset for a certain set time. When the filling process has been completed, a pressure command by the system brings about a change from the filling pressure directly to the target value specified.

BRIEF DESCRIPTION OF THE DRAWINGS

Below, the invention is explained with reference to the attached figures, considering the example of an all-wheel disc clutch of an all-wheel transfer transmission. The figures show.

DETAILED DESCRIPTION OF THE PREFERRED EMBODIMENTS

Figure 1:
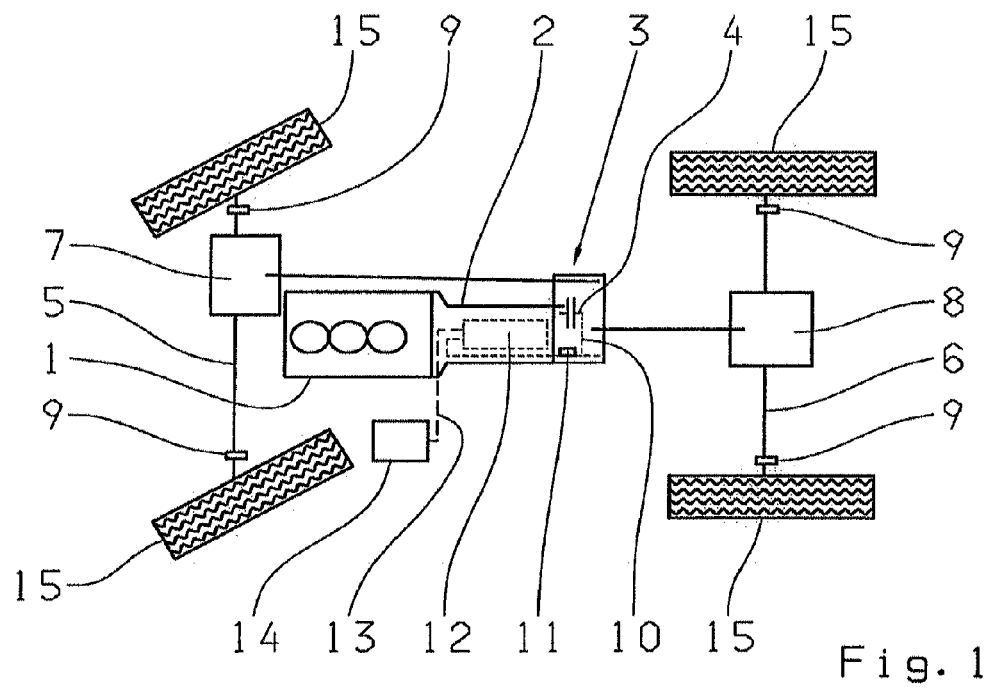
FIG. 1: A schematic overall representation of a drive-train of a motor vehicle, comprising an all-wheel transfer transmission with an all-wheel disc clutch.

FIG. 1 shows a drive-train of an all-wheel-drive vehicle. It comprises an internal combustion motor 1, a transmission 2 downstream from the motor 1, and an all-wheel transfer transmission 3 downstream from the transmission 2 which, depending on its actuation, transmits torque by means of an all-wheel disc clutch 4 to the two driven axles 5, 6 of the vehicle. Each of the axles 5, 6 has a respective differential 7 or 8 and in the example shown a wheel rotation speed sensor 9 is associated with each wheel 15 of the driven axles 5, 6.

In the attached FIG. 1 the index 10 is used to denote a hydraulic line connected to the hydraulic control unit 12, by way of which the all-wheel disc clutch 4 can be pressurized; in addition, indexed as 11 is a pressure sensor which, according to the invention, serves to sense the filling pressure in the disc shifting element; the electronic transmission control unit connected via a signal line 13 to the hydraulic control unit 12 is indexed 14.

Figure 2:
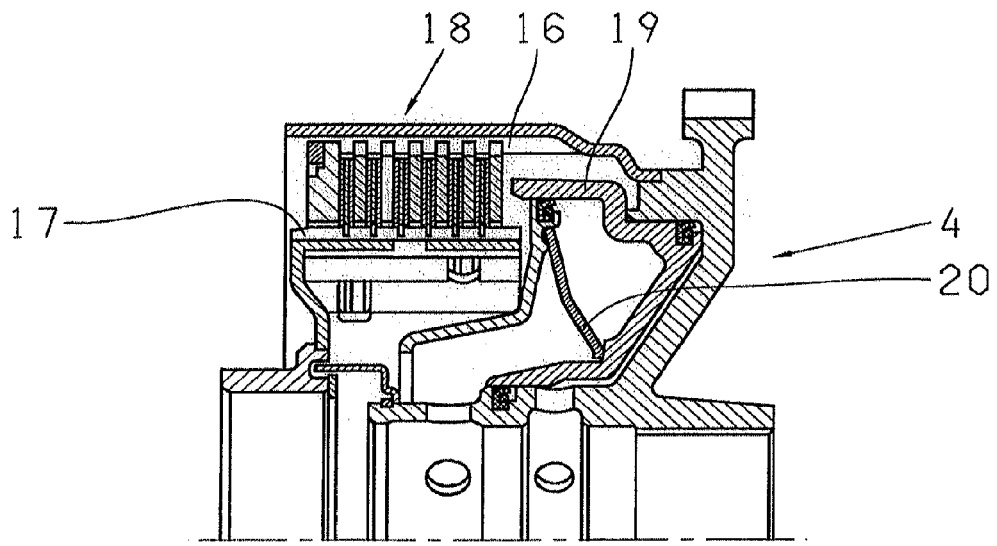
FIG. 2: A schematic sectioned view of an all-wheel disc clutch.

A detailed view of the all-wheel disc clutch 4 is the object of FIG. 2. The all-wheel disc clutch 4 comprises a disc packet 18 with an outer disc carrier 16 and an inner disc carrier 17, the inner disc carrier 17 being functionally connected to an axially displaceable piston 19 which can be moved axially by hydraulic pressure against the force of a spring element 20, whereby the disc clutch 4 can be actuated in its closing direction.

Figure 3:
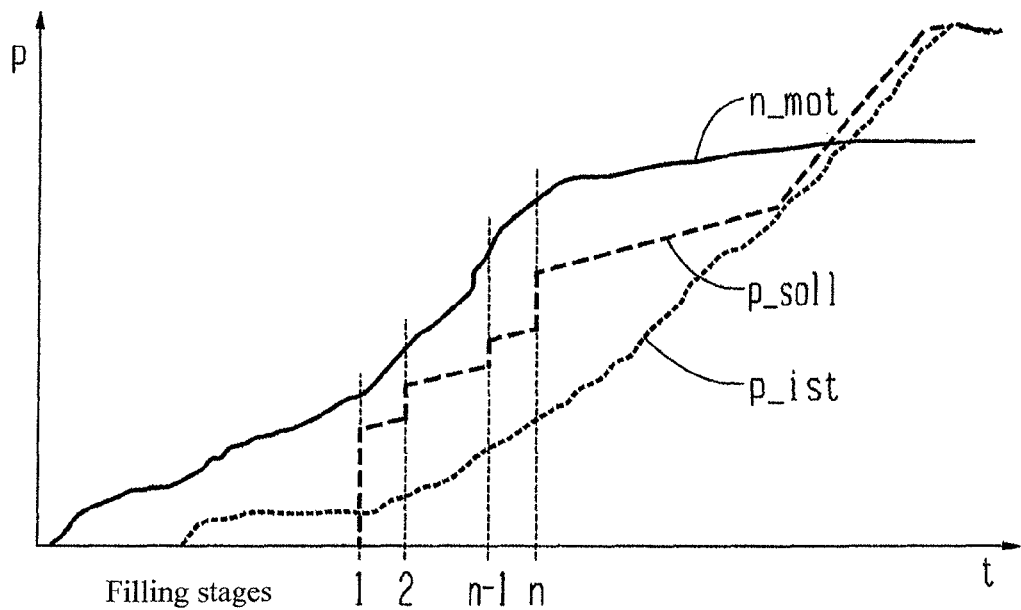
FIG. 3: A diagram showing the variation with time of the motor speed n_mot and the target and actual pressures p_soll, p_ist according to the invention, as a function of the time t.

According to the invention and referring to FIG. 3, in the method for the rapid filling of a hydraulically actuated disc shifting element 4 of a motor vehicle transmission, in particular a disc clutch of an all-wheel transfer transmission 3, it is proposed that the filling of the disc clutch 4 takes place as a function of the motor speed n_mot of the motor vehicle, in such manner that the disc shifting element is filled using a target pressure value p_soll for the filling pressure, which depends on the motor speed n_mot; in addition it is envisaged that if the motor speed n_mot changes during a filling process, the target value for the filling pressure is adapted as a function of the new motor speed n_mot in such manner that an increase of the motor speed n_mot brings about an increase of the filling pressure.

In the example shown in FIG. 3, the motor speed range of the internal combustion motor 1 of the motor vehicle is divided into n intervals, and with each of the intervals there is associated a filling stage, i.e. a target pressure variation as a function of time, with which the filling of the disc shifting element 4 is carried out when the motor n_mot is within the interval concerned.

As can be seen from FIG. 3, a change of the motor speed n_mot during a filling process can cause the current motor speed n_mot to move into a different interval from the motor speed n_mot before the change of the motor speed, and this results in the continuation of the filling process with reference to the filling stage associated with the interval in which the motor speed is currently contained.

Figure 4:
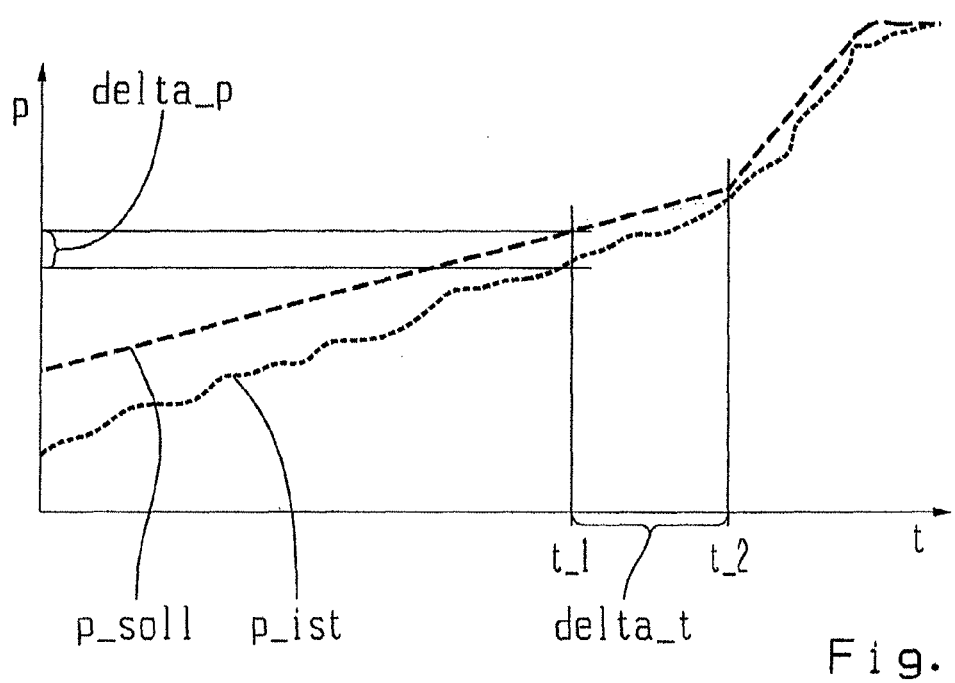
FIG. 4: A diagram showing the variations of the target pressure p_soll and the actual pressure p_ist as a function of time t, to illustrate the recognition according to the invention of a completed filling process.

According to the invention and referring to FIG. 4, the end of the filling of the disc shifting element 4 is determined from the actual pressure p_ist measured by a pressure sensor 11, whereby an event-controlled filling of a disc clutch is enabled and it is not necessary to specify fixed filling times.

In this case the filling of the disc shifting element 4 ends when the actual pressure p_ist in the disc shifting element, preferably determined by the pressure sensor 11 as a function of the target pressure value p_soll for the filling pressure, falls below an adjustable limiting pressure offset for a certain, set time.

In FIG. 4 the limiting pressure offset is denoted delta_p and the set time is denoted delta_t. In the interval between times t_1 and t_2, which corresponds to the set time delta_t, the difference between the actual pressure p_ist and the target pressure p_soll is smaller than the offset delta_p, which according to the invention results in the recognition that the process of filling the disc shifting element 4 has been completed. Accordingly, from time t_2 onwards the pressure changes directly from the filling pressure to the specified target value.

As already mentioned, according to the invention the filling of a disc shifting element can be carried out as a function of not only of the motor speed, but also of the transmission temperature and/or the selector lever position.

The disc shifting element 4 can be controlled during filling, for example with reference to a performance characteristic stored in the hydraulic control unit 12 or in the electronic transmission control unit 14, which contains as parameters for determining the target pressure p_soll for the filling pressure the parameters used, such as the transmission temperature, the selector lever position and the filling stage.

The filling stage can be determined, for example, from a characteristic curve which, as its parameter, contains the motor speed of the internal combustion motor. In addition the signal from a pressure sensor 11 arranged in the disc shifting element 4 is transmitted to the electronic transmission control unit 14 or to the hydraulic control unit 12, to enable the recognition of a completed filling process as a function of the actual pressure.

In cases when the filling is carried out independently of the selector lever position, the performance characteristic stored in the hydraulic control unit 12 or in the electronic transmission control unit 14 contains as parameters the transmission temperature and the filling stage.

By virtue of the concept according to the invention, that of time-optimized, event-controlled filling, compared with the time-controlled methods known from the prior art the filling time required for a disc shifting element is considerably reduced since changes of the motor speed, which enable more rapid filling, are directly taken into account.

INDEXES

1 Internal combustion motor
2 Transmission

3 All-wheel transfer transmission
4 All-wheel disc clutch
5 Driven axle
6 Driven axle
7 Differential
8 Differential
9 Wheel speed sensor
10 Hydraulic line
11 Pressure sensor
12 Hydraulic control unit
13 Signal line
14 Electronic transmission control unit
15 Wheel
16 Outer disc carrier
17 Inner disc carrier
18 Disc packet
19 Piston
20 Spring element
n_mot Motor speed
p_ist Actual pressure
p_soll Target pressure
t Time
p Pressure
delta_p Adjustable limiting pressure offset
delta_t Adjustable time
t_1 Time point
t_2 Time point

The invention claimed is:

1. A method of rapid filling of a hydraulically actuated multiple-disk shifting element (4) of a motor vehicle transmission (2), the method comprising the steps of:
    filling the multiple-disk shifting element (4) using a target value (p_soll) for a filling pressure which depends on a motor speed (n_mot);
    adapting the target value (p_soll), for the filling pressure, as a function of a new motor speed (n_mot), if the motor speed (n_mot) changes during a filling process;
    determining an end of the filling of the multiple-disk shifting element (4) with reference to an actual pressure (p_ist) in the multiple-disk shifting element (4); and
    terminating the filling of the multiple-disk shifting element (4) when the actual pressure (p_ist), measured by a pressure sensor (11) as a function of the target value (p_soll) for the filling pressure, is lower than a certain adjustable limiting pressure offset (delta_p) for a set time (delta_t).

2. The method of the rapid filling of the hydraulically actuated multiple-disk shifting element (4) of the motor vehicle transmission (2) according to claim 1, further comprising the steps of:
    increasing the target value (p_soll), for the filling pressure, when the motor speed (n_mot) increases, since a larger oil volume flow is available due to a higher motor speed, and
    reducing the target value (p_soll) for the filling pressure, taking an adjustable hysteresis into account, when the motor speed (n_mot) decreases.

3. The method of the rapid filling of the hydraulically actuated multiple-disk shifting element (4) of the motor vehicle transmission (2) according to claim 1, further comprising the steps of:
    dividing a motor speed range, of an internal combustion motor (1) of the motor vehicle, into a plurality of intervals (n),
    associating a filling stage with each of the plurality of intervals as a function of time, and
    carrying out the filling of the multiple-disk shifting element (4) with the filling stage when the motor speed (n_mot) is within an associated interval.

4. The method of the rapid filling of the hydraulically actuated multiple-disk shifting element (4) of the motor vehicle transmission (2) according to claim 1, further comprising the step of filling of the multiple-disk shifting element (4) as a function of, in addition to the motor speed, at least one of a transmission temperature and a selector lever position.

5. The method of the rapid filling of the hydraulically actuated multiple-disk shifting element (4) of the motor vehicle transmission (2) according to claim 4, further comprising the step of increasing the target value (p_soll), for the filling pressure, when the transmission temperature increases, since a temperature rise results in increased leakage losses in a hydraulic system.

6. The method of the rapid filling of the hydraulically actuated multiple-disk shifting element (4) of the motor vehicle transmission (2) according to claim 4, further comprising the step of filling the multiple-disk shifting element (4) using a higher target value (p_soll), for the filling pressure, when the selector lever position is either neutral or park (N or P) position than when the selector lever position is a drive (D) position.

7. The method of the rapid filling of the hydraulically actuated multiple-disk shifting element (4) of the motor vehicle transmission (2) according to claim 1, further comprising the steps of:
    controlling the multiple-disk shifting element (4), during filling, with reference to a performance characteristic stored in either a hydraulic control unit (12) or an electronic transmission control unit (14) which contains, as parameters for determining the target value (p_soll) for the filling pressure, the parameters of at least one of a filling stage, a transmission temperature and a selector lever position used, and
    determining the filling stage with reference to a characteristic curve containing the motor speed (n_mot) as a parameter.

8. A method of rapidly filling a hydraulically actuated disk clutch (4) of an all-wheel transfer transmission (3), the method comprising the steps of:
    filling the disk clutch (4) to a target pressure value (p_soll) which depends on a motor speed (n_mot);
    adapting the filling of the disk clutch, when the motor speed (n_mot) changes during a filling process, by adapting the target pressure value (p_soll) as a function of the change in the motor speed (n_mot),
    sensing actual pressure (p_ist) in the disk clutch with a sensor; and
    terminating the filling of the disk clutch when a difference between the actual pressure (p_ist) and the target pressure value (p_soll) is lower than a limiting pressure offset (delta_p) over a set period of time (delta_t).

* * * * *